Mar. 20, 1923.

W. V. SEIFERT.
ROLLER BEARING.
FILED JULY 19, 1920.

Inventor
William V. Seifert
By William C. Linton
Attorney

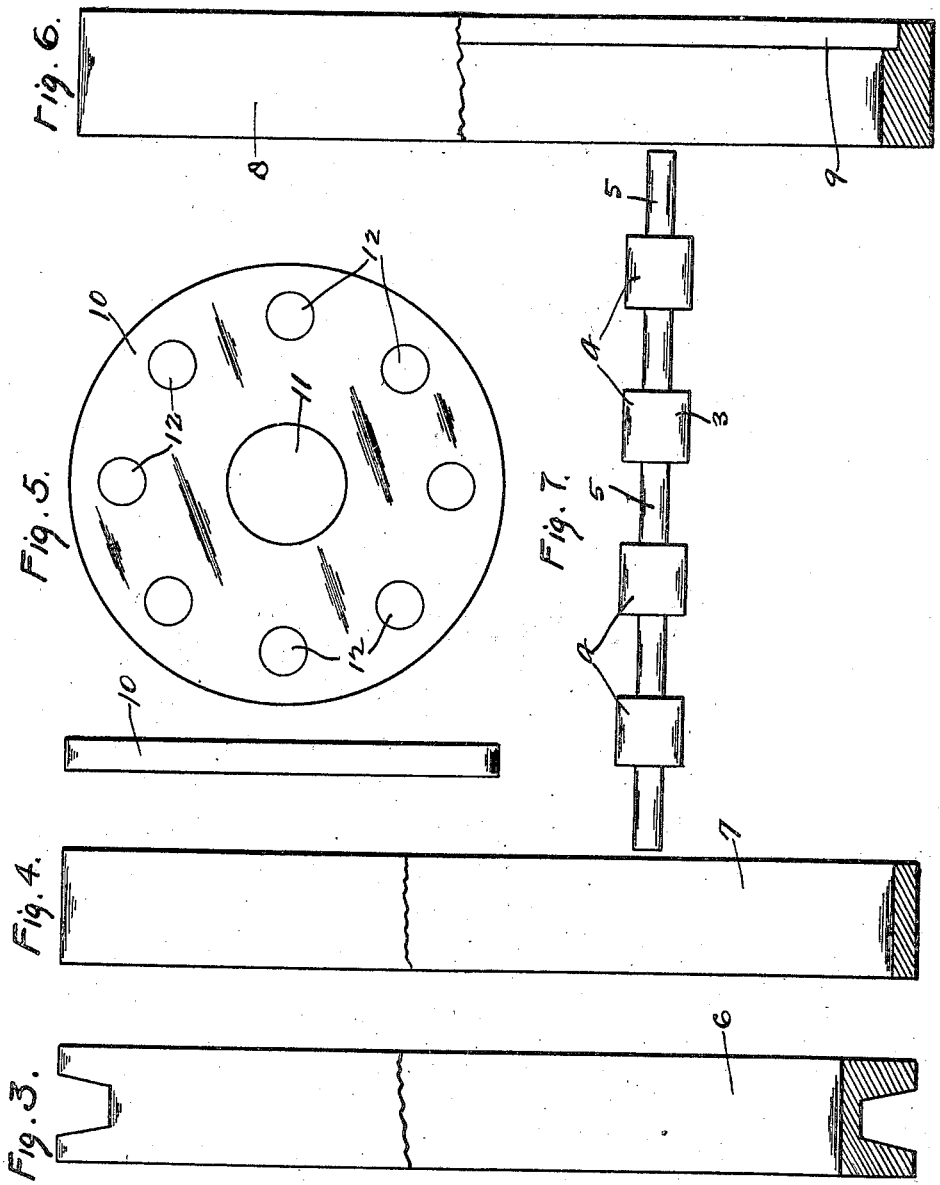

Patented Mar. 20, 1923.

1,448,771

UNITED STATES PATENT OFFICE.

WILLIAM V. SEIFERT, OF DENVER, COLORADO.

ROLLER BEARING.

Application filed July 19, 1920. Serial No. 397,495.

*To all whom it may concern:*

Be it known that WILLIAM V. SEIFERT, citizen of the United States, residing at 4546 West Hayward Place, in the city and county of Denver and State of Colorado, has invented certain new and useful Improvements in Roller Bearings.

This invention relates to bearings, and more particularly to a bearing comprising rollers of different diameters.

An object of the invention is the provision of a bearing that will eliminate friction and end thrust.

In the present invention, I provide a roller having portions thereof of different diameters, and a set of bearing rings surrounding said rollers, certain of said rings engaging the enlarged portions of the shaft, and others engaging the reduced portions. The rings of larger diameter thus serve as spacing rings for the rings of smaller diameter, and by assembling the parts so that no play is present between the rings, end thrust is eliminated. The ends of the bearing are provided with plates secured to a container cylinder by means of screw threads whereby the parts may be adjusted when assembled to take up all play and insure perfect alignment.

A further object is the provision of means for permitting end movement of the bearing as a whole, with respect to the member surrounding the shaft.

In the accompanying drawings, I have shown one embodiment of the invention.

In this showing:

Figure 3 is an end elevation, partly in section, of one of the interior rings of small diameter;

Figure 4 is a similar view of one of the interior rings of large diameter;

Figure 5 is a side elevation and end view of a spacing ring;

Figure 6 is an end elevation, partly in section, of an end ring; and,

Figure 7 is a detail view of one of the rollers.

Figure 1:
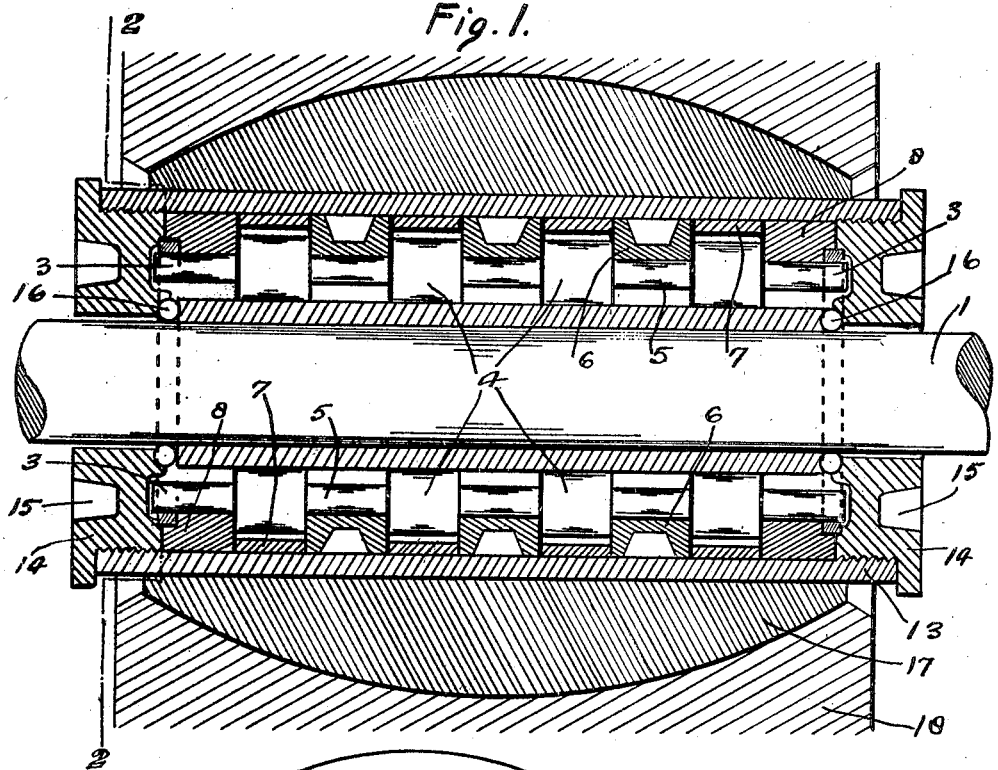
Figure 1 is a central, vertical longitudinal, sectional view.
Figure 2:
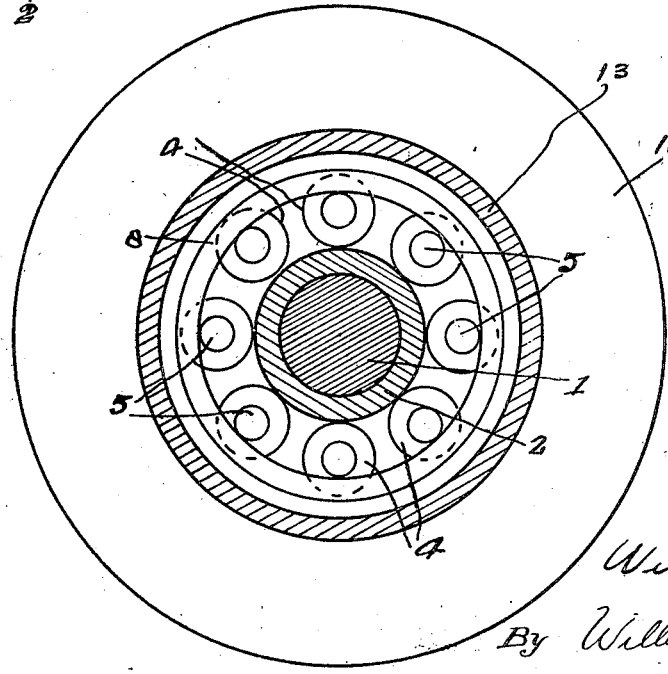
Figure 2 is a vertical transverse sectional view on the line 2—2 of Figure 1 with the spacing ring removed.

Referring to the drawings, the reference numeral 1 designates a shaft, surrounded by a sleeve or cylinder 2. A plurality of rollers 3 are arranged around the shaft. As shown the rollers consist of alternate enlarged and reduced portions 4 and 5. Two sets of interior rings are arranged around the rollers, one set consisting of rings 6, whose interior diameter is substantially equal to the distance between the outer faces of two of the reduced portions 5 on opposite sides of the shaft. The width of the rings is also substantially equal to the length of the reduced portions. These rings are spaced from each other by rings 7, having a greater diameter and being adapted to surround the enlarged portions 4 of the rollers.

Adjacent each end of the bearing, an end ring 8 is provided, the interior diameter of which is equal to the diameter of the ring 6. The outer face of the end ring is provided with a recess 9 for the reception of a spacing plate ring 10. This plate is provided with a central opening 11 for the passage of the shaft, and a plurality of concentric openings 12 adapted to receive the ends of the rollers 3 and thus maintain them in proper position. The bearing is surrounded by an outer sleeve or cylinder 13, which is interiorly screw threaded at each end. An end plate 14 is secured in each end of the cylinder, the plate being provided with threads adapted to engage the threads of the cylinder. The end plates may be provided with recesses 15 for the reception of a wrench or other tool. The inner face of the end plate is provided with a groove or depression in alignment with a similar groove or depression in the end of the inner sleeve or cylinder 2 and suitable anti-friction balls 16 may be arranged therein.

The entire structure is received in a ball member 17 formed of two hemispherical sections having a cylindrical opening therein and this ball member is mounted in a socket member 18.

In assembling the bearing, the interior rings 7 serve as spacing rings for the interior rings 6. The shaft contacts with one side of the enlarged portion 4 of each roller, and the rings 6 contact with the opposite side of the reduced portion 5. Thus no two opposite points of the roller are in contact, and pinching is prevented.

The end plates 14 may be adjusted to take up all plates longitudinally of the shaft, and thus eliminate end thrust. This arrangement produces perfect rolling friction and prevents sliding friction.

What I claim is:

1. A roller bearing including inner and outer sleeves, a plurality of rollers arranged between the sleeves and each having alternate enlarged and reduced portions, track rings disposed within the outer sleeve on opposite sides of the enlarged portions of the rollers and contacting with the reduced portions of the rollers, spacer rings arranged between and in intimate contact with the track rings, end rings disposed adjacent the outer edges of the outer sleeve, cage forming rings seated in the end rings and accommodating the outer reduced portions of the rollers, and means adjustably engaged within the outer sleeve for closing the ends thereof, substantially as and for the purpose set forth.

2. A roller bearing including inner and outer sleeves, the outer end edges of the inner sleeve being formed with ball races, the inner surface of the outer sleeve near the outer edges being threaded, a plurality of rollers each having alternate enlarged and reduced portions arranged between the sleeves, track rings disposed within the outer sleeve on opposite sides of the enlarged portions of the rollers and contacting with the reduced portions thereof, spacer rings disposed between and in intimate contact with the side edges of the track rings, said spacer rings being also arranged about but spaced from the enlarged portions of the rollers, end rings arranged within the outer sleeve near the ends thereof and provided with recesses on the inner faces thereof, cage forming rings seated in the recesses in the end rings and provided with openings for receiving the outer reduced portions of the rollers, end plates adjustably engaged with the threaded ends of the sleeves and provided with ball races on their inner faces, and bearing balls operating in the opposed races in the inner sleeve and end plates.

In testimony whereof affix signature, in presence of two witnesses.

WILLIAM V. SEIFERT.

Witnesses:
 Louis C. Rush,
 J. I. Hollingsworth.